United States Patent [19]

Chung et al.

[11] Patent Number: 4,584,505
[45] Date of Patent: Apr. 22, 1986

[54] TORQUE-SPEED CONTROL SYSTEM FOR ASYNCHRONOUS D.C. BRUSHLESS MOTOR

[76] Inventors: Yeongchoon Chung, 703-20, Jisandong, Dongku, Kwangjushi Jeonranamdo, Rep. of Korea; Myunghwan Kim, 2387 N. Triphammer Rd., Ithaca, N.Y. 14850

[21] Appl. No.: 620,586

[22] Filed: Jun. 14, 1984

[51] Int. Cl.⁴ .................................................. H02P 6/02
[52] U.S. Cl. ..................................... 318/254; 318/138; 318/439
[58] Field of Search ..................... 318/138, 254 A, 254, 318/439

[56] References Cited

U.S. PATENT DOCUMENTS

| 3,345,547 | 10/1967 | Dunne | 318/138 |
|---|---|---|---|
| 3,564,370 | 2/1971 | Catherin | 318/439 X |
| 3,569,806 | 3/1971 | Brailsford | 318/439 X |
| 3,753,067 | 8/1973 | Milligan | 318/314 |
| 3,916,272 | 10/1975 | Grunleitner et al. | 318/254 A |
| 4,088,908 | 5/1978 | Gumen et al. | 318/254 X |
| 4,344,023 | 8/1982 | Yokobori et al. | 318/254 A |

FOREIGN PATENT DOCUMENTS

| 52-43926 | 4/1977 | Japan | 318/254 |
|---|---|---|---|
| 55-111689 | 8/1980 | Japan | 318/254 |
| 57-160386 | 10/1982 | Japan | 318/254 |
| 1528573 | 10/1978 | United Kingdom | 318/254 |
| 2039095 | 7/1980 | United Kingdom | 318/254 |
| 1590286 | 5/1981 | United Kingdom | 318/254 |

Primary Examiner—William M. Shoop, Jr.
Assistant Examiner—Bentsu Ro
Attorney, Agent, or Firm—Jones, Tullar & Cooper

[57] ABSTRACT

A closed loop, asynchronous control circuit for a brushless D. C. motor is disclosed. The motor includes a stator having two-phase windings and a permanent magnet rotor. A binary code corresponding to the stator poles is carried by the rotor, and is detected by a sensor upon rotation of the rotor. The sensor provides a feedback signal comprising a train of pulses having a repetition rate, or pulse width, proportional to the rotor speed. The feedback signal is supplied to a delay circuit, and a delayed control pulse train is supplied to a logic circuit which produces a two-phase output. The logic circuit output charges the polarities of the motor stator windings in accordance with the transitions of the control pulse train between high and low values, to thereby control the motor speed.

The delay circuit is variable to control the speed of the motor. A variable supply provides a controlled voltage level to switching circuits which drive the motor under the control of the two-phase logic circuit output. The voltage level is varied inversely with the delay time of the delay circuit to control the motor torque-speed characteristic.

7 Claims, 13 Drawing Figures

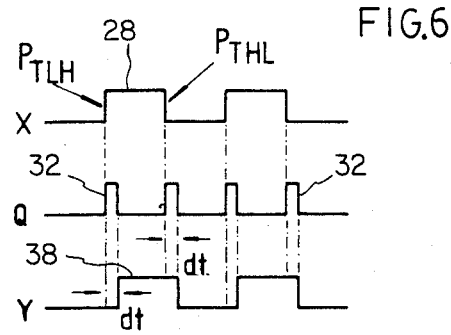
FIG.6
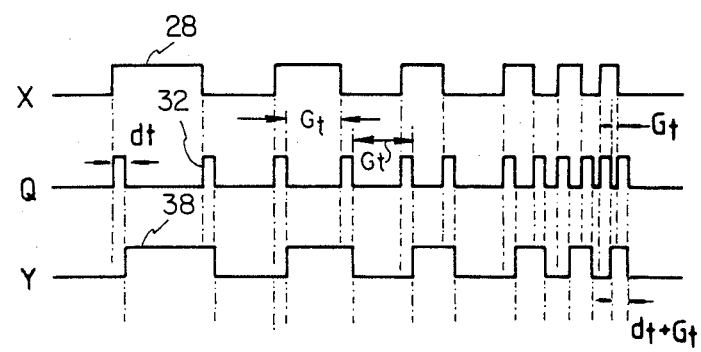
FIG.7
FIG.8 (A)  FIG.8 (B)  FIG.8 (C)
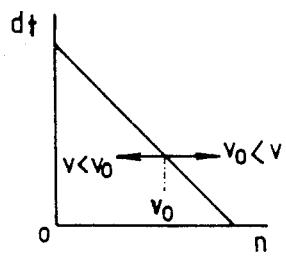 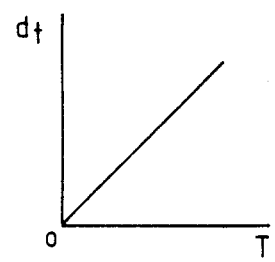 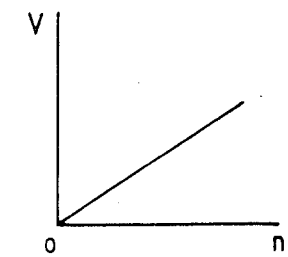
FIG.9 (A)  FIG.9 (B)
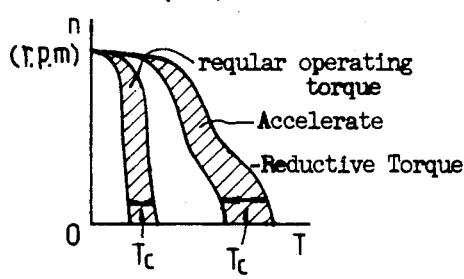 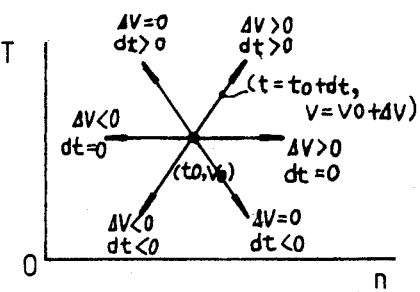

TORQUE-SPEED CONTROL SYSTEM FOR ASYNCHRONOUS D.C. BRUSHLESS MOTOR

BACKGROUND OF THE INVENTION

The present invention concerns a controller for a brushless D. C. motor, including a permanent magnet rotor and a two phase winding stator and, more particularly, to a brushless D. C. motor, including such a controller.

In the past, motor controllers have combined a simple logic circuit for producing two phase currents with a two phase bridge circuit to obtain bipolar switching. By closed loop and open loop control, i.e., asynchronous and synchronous control, a brushless D. C. motor can be controlled for a wide range of speed and torque.

Generally, however, the speed-torque characteristics of a motor controlled by asynchronous torque for speed control produces low torque at low speed and a wide fluctuation of speed according to load variation. Many methods were presented in the past to improve these characteristics, but the cost for implementing such methods was unsatisfactory.

In some prior controllers for D. C. brushless motors, the rotor speed is determined according to the stator winding current by the closed loop method, in which the position of the rotor is detected and a position signal is fed back to control the stator current so as to produce a desired torque at $\pi/2$ radians. It was possible to control the speed by varying the stator winding current because the rotating magnetic field produced by the stator coincides with the rotor speed. However, it is not possible for such a brushless motor to generate a constant torque for a wide range of the rotor speed because the speed-torque characteristics of such a brushless motor is almost identical to that of the conventional asynchronous motor.

SUMMARY OF THE INVENTION

The objective of the present invention is to introduce an efficient speed-torque control for a D. C. brushless motor which generates not only a constant torque for a wide range of rotor speed by superimposing an easily controllable reaction torque on the asynchronous torque, but which maximizes the starting torque and the torque at low speed under a constant applied voltage. The operational principle of the controller of the present invention is basically similar to that of a brushless motor. The purpose of the control system, therefore, is to provide an asynchronous, two-phase, D. C. brushless motor wherein the motor torque and motor speed are controlled over a wide range of speeds. The control is obtained by regulating the delay time of a feedback signal, which signal is generated in response to the position of the rotor of the D. C. motor. The amount of the delay regulates the torque, and the speed of the motor. The power source is regulated inversely with the delay time.

BRIEF DESCRIPTION OF THE DRAWINGS

The present invention is described in detail, with reference to the accompanying drawings in which:

FIG. 6 shows in diagrammatic form the pulse delay of the pulse delay circuit of FIG. 5A;

FIG. 7 shows wave forms of the pulse which detects the position of the rotor according to action of the pulse delay circuit of FIG. 5A;

FIG. 8A shows the characteristics of the delay time (dt) vs. the rotating speed (n);

FIG. 8B shows the characteristics of the delay time (dt) vs. the torque (T);

FIG. 8C shows the characteristics of the voltage control ($\Delta v$) vs. the rotating speed (n);

FIG. 9A shows the characteristics of the torque vs. the speed for a fixed delay time (dt);

FIG. 9B shows the characteristics of the torque (T) vs. the speed for the various delay time (dt) and voltage control ($\Delta v$).

DESCRIPTION OF THE PREFERRED EMBODIMENT

Figure 1:
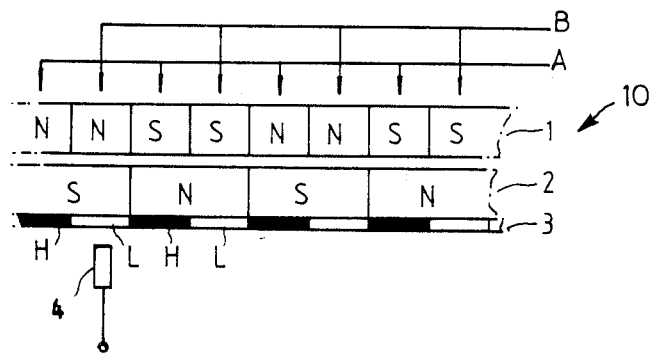
FIG. 1 shows in diagrammatic form the magnetic field poles of the rotor and stator of a 2Φ D. C. brushless motor.

Referring now to FIGS. 1-4 of the drawings, a two-phase (2Φ) D. C. brushless motor 10 having a stator 1 and a rotor 2 is diagrammatically illustrated. The rotor 2 carries high (H) and low (L) logic level binary code marks 3 corresponding to the magnetic poles of the stator 1. A conventional optical sensor 4 is used to detect the binary code marks 3, and the magnetic poles of the stator 1 are changed according to the detected logic level. The circuit for detecting the logic level consists of a pulse delay circuit 7 and a two phase pulse logic circuit 9. The two phase outputs A and B from logic circuit 9 are connected to corresponding controlled bridges 12 and 14 which, in turn, are connected to phase A windings 16 or phase B windings 18, respectively, on stator 1. A voltage controller 20 supplies D.C. power from A. C. source 22 to the bridges 12 and 14 to provide power for windings 16 and 18 under the control of logic circuit 9. The pulse delay circuit 7 and the voltage control circuit 2 are designed such that changes in the voltage are inversely proportional to changes in the pulse delay time.

FIG. 1 is a fold-out picture of the magnetic field of the stator and rotor 2 and shows the magnetic poles of the two phase winding stator, the position of the rotor poles with respect to the stator poles, and the position detecting sensor 4 for explaining the principle of asynchronous torque generation. The poles of the stator are distributed in phase pairs shown at A and B of FIG. 1 and the poles of the rotor 2 are matched with the pole pairs of the stator 1.

Figure 2:
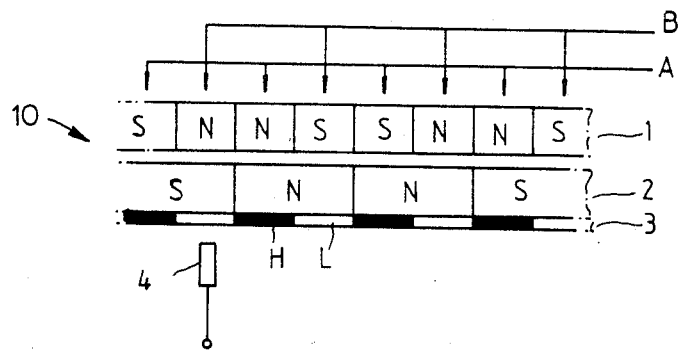
FIG. 2 shows in diagrammatic form the transition of the poles of the stator and the resulting torque generation.
Figure 3:
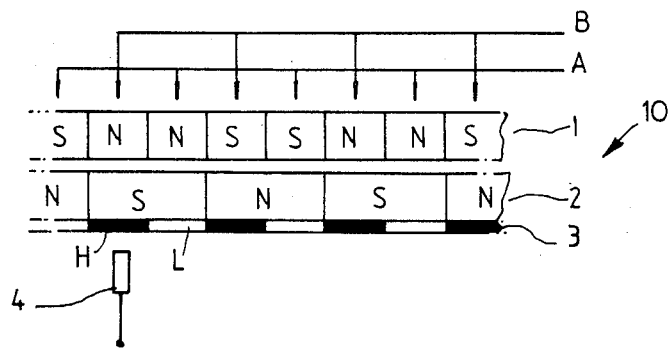
FIG. 3 shows in diagrammatic form the detection of the rotor movement and position, following the transition of the stator poles.

The binary code marks 3 are attached to the rotor to generate logic signals high (H) and low (L) according to the position of the rotor with respect to the stator, the stationary mark detecting sensor 4 being placed at a predetermined stator position, preferably at the center point of a stator pole piece, and shown in FIG. 1 as sensing a low (L) region. When this mark-detecting sensor 4 detects the low (L) region, the magnetic poles of winding A are changed and when the high (H) region is detected, the magnetic poles of winding B are changed. FIG. 2 shows the changed poles of winding A while the poles of winding B remain the same. When the poles of winding A are changed, a torque is generated and the rotor 2 is moved one step as shown in FIG. 3. At this point, the mark-detecting sensor 4 detects the high (H) region, so the poles of winding B are changed to move the rotor one more step. In this way pole changes occur successively and an asynchronous torque with a rotating magnetic field leading $\pi/2$ radians is generated.

Figure 4:
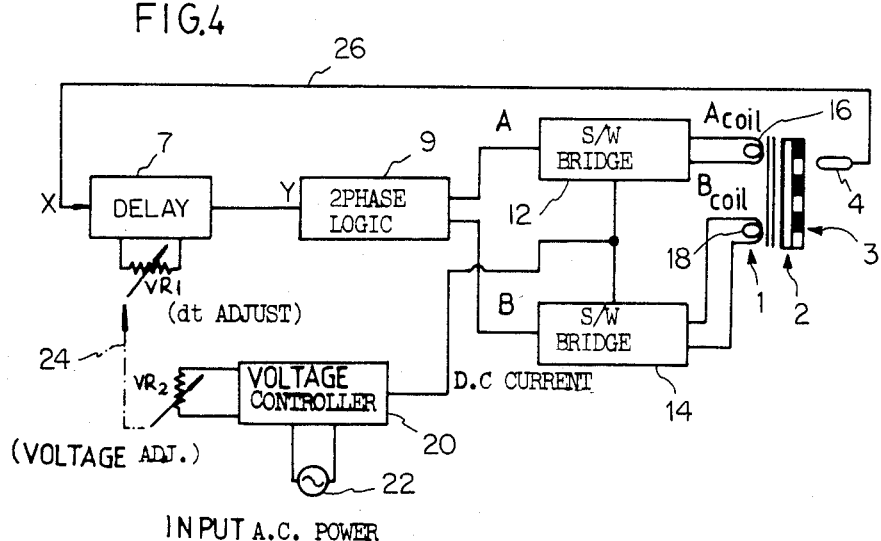
FIG. 4 shows a block diagram of the motor controller of the present invention.

FIG. 4 shows a closed loop control system formed by the pulse delay circuit 7 and the voltage control circuit 20. When an input D. C. voltage is supplied by circuit 8, windings A and B are excited through the bridge circuits 12 and 14 for bipolar switching. As explained in FIGS. 1-3, the sensor 4 generates pulses for $\pi/2$ radians leading torque, and in response thereto the poles of windings A and B are successively changed by pulses from the two phase pulse logic circuit 9 to provide an asynchronous leading torque which tends to accelerate the motor. To provide control of the motor speed, however, the changing of the poles of the windings is delayed by means of the pulse delay circuit 7. This delay prevents the immediate switching of the stator poles when the detector 4 switches from a high to a low output, or vice versa, and the delay thus provides a reaction torque in the rotor. Thus, the rotor is accelerated by the asynchronous leading torque, and the reaction torque acts for the duration of the time interval, determined by the pulse delay circuit, to produce damping in the motor. The controller system of the present invention includes a variable resistor $VR_1$ which adjusts the delay (dt) provided by delay control circuit 7 and a variable resistor $VR_2$ which adjusts the voltage level of the output from voltage controller 20. Manual control 24 permits simultaneous adjustment of $VR_1$ and $VR_2$ and thus the delay time (dt) of the pulse delay circuit is inversely proportional to the output level of voltage controller 20.

Figure 5:
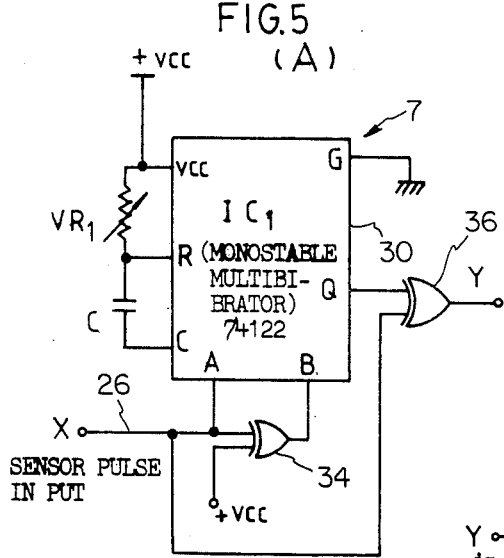
FIG. 5A shows the pulse delay circuit in the controller of FIG. 4.
FIG. 5B shows the two phase pulse logic circuit in the controller of FIG. 4.
Figure 5:
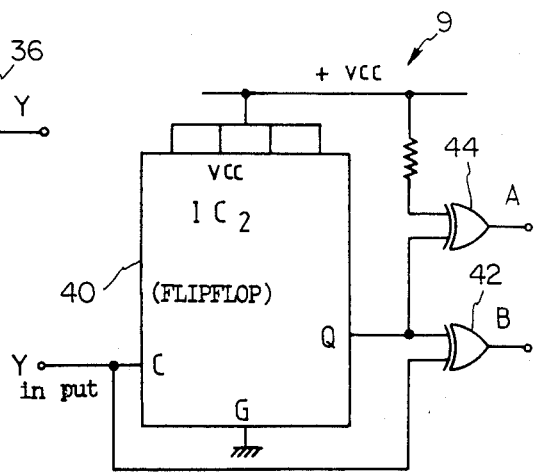

FIG. 5A shows the pulse delay circuit 7 and FIG. 5B the two phase pulse generating logic circuit 9. In the pulse delay circuit (FIG. 5A), the rising phase (pulse transition low to high-PTLH) and the descending phase (pulse transition high to low, or "PTHL") of the sensor 4 output pulse supplied on line 26 to pulse delay circuit 7, and shown in FIG. 6 at pulse 28 are delayed by the time interval determined by the resistance $VR_1$ and the capacitance C of the pulse delay circuit. In the pulse delay circuit, a monostable multivibrator 30, which may be an integrated circuit IC 74122, generates a pulse output 32 whose width is determined by $VR_1$ and C. That is, at the moment input B changes from L to H while input A is low (L), output Q generates a single, short pulse, shown at 32 in FIG. 6, whose width is determined by $VR_1$ and C. This is a delay pulse having a time delay dt. Again, at the moment input A changes from H to L while input B is high (H), output Q again produces another single, short delay pulse 32. Inputs A and B are connected with NOT gate 34, which is illustrated in FIG. 5A as an exclusive OR gate, but which is connected in the circuit to serve as a logic NOT gate and to function as an inverter so that $B=\overline{A}$. By this method the output (Q) pulse 32 with the desired width is generated. The output (Q) and the output from sensor 4 are connected to corresponding inputs of exclusive OR (EX-OR) gate 36 to produce a delayed pulse 38 at output Y, as shown in FIG. 6.

FIG. 5B shows the circuitry of the two-phase pulse generating logic circuit 9 as including a flip-flop 40, which preferably is an integrated circuit IC 7473. When delayed pulses 38 from the pulse delay circuit arrive at input Y of the flip-flop 40, its output (Q) generates pulses having widths determined by the time between the rising edge of a first input pulse 38 and the rising edge of the next pulse 38. Flip-flop output (Q) and the input (Y) are EX-ORed at NOT logic function gate 42 and output Q is EX-OR-ed with a bias source Vcc at gate 44 to produce two phase pulses A and B which have a 90° phase difference. Thus, each time the feedback logic signal produced by the sensor 4 goes high (H) or low (L), EX-OR gates 42 and 44 are used to produce switching by the two phase bipolar switching circuit, the outputs A and B from logic circuit 9 switching the bridges 12 and 14, respectively, to shift the polarities of the stator windings and thus to shift the stator poles, as illustrated in FIGS. 1-3. Therefore, it is possible to change the poles of windings A and B, in accordance with the position of the rotor, so that the torque angle is always leading by $\pi/2$ radians.

FIG. 7 shows the pulses produced at points X, Q and Y of the delay circuit 7 during operation of the motor, where the motor is initially at rest and is accelerated to a constant speed by the closed loop control. When a D.C. voltage from voltage controller 20 is applied to the motor, its rotor is started and accelerated by a rotating torque supplied by current flowing in coils 16 and 18 on the stator. As the speed of the rotor increases, the width of the pulses 28 produced by sensor 4 on line 26 decreases, as shown at X in FIG. 7. Since the width of the delay pulse 32 on output Q of the multivibrator 30 remains constant for a given setting of variable resistor $VR_1$, the difference $G_t$ between the widths of the pulses 28 and 32 gradually decreases. The difference $G_t$ may be referred to as the inertia delay time of the rotor, which is the time between the switching of one set of poles A or B under the control of the pulse on Y, and the start of a pulse on X, which calls for the next switching operation on the other set of poles. The width of pulse 38 on output Y also decreases with the decrease in the width of pulse 28, but remains equal in width to pulse 28; i.e., equal to $(dt+G_t)$.

Pulse 38 on output Y is the signal which regulates the switching of bridges 12 and 14 and, since it is produced by EX-OR gate 36, it cannot have a width less than dt; i.e., less than the delay pulse 32. The switching speed of the poles, which is the stator transition rate, cannot exceed the maximum rate of the multivibrator output at Q, and thus is limited by the rate of the delay pulses 32. But there is also a rotor inertia delay $G_t$ in the control loop, which occurs between a transition of pulse 38 from low to high or vice versa, and a transition of pulse 28; i.e., between the time when the poles A or B are switched in polarity and the time when the sensor 4 detects the next binary mark 3 to produce the next pulse 28 transition. Accordingly, the speed of the motor is actually limited to a rate determined by the delay time dt plus the rotor inertia time $G_t$, or to a rate slightly greater than the selected rate of the multivibrator.

As the delay time dt of the closed loop control system is increased by changing the value of $VR_1$, the maximum speed of the motor is decreased. However, at the same time, the torque of the motor is increased, since $VR_1$ is coupled to $VR_2$ in the voltage controller to produce a correspondingly increased voltage for application to the motor.

FIG. 8A shows the characteristics of the delay time (dt) vs. speed (n); FIG. 8B shows that of the delay time (dt) vs. torque (T); and FIG. 8C shows that of voltage vs. speed.

By the control method of the present invention, it is possible to regulate the control torque (TC), as shown in FIG. 9A, and to produce a large torque at low speed, because the delay control resistance $VR_1$ and voltage control resistance $VR_2$ in FIG. 4 are connected such that the voltage control is inversely proportional to the delay time (dt) of the pulse delay circuit. This results in control of the speed-torque characteristics of the motor, as shown in FIG. 9B, again by controlling the pulse delay time (dt) and the voltage (V). Thus, a constant torque can be maintained for a wide range of speed. Also, starting and driving torques can be easily and effectively controlled by the control method of the present invention, when necessary.

We claim:

1. A controller for a brushless two-phase motor including a rotor and a stator having first and second windings defining stator poles, comprising:

a binary code marking on said rotor, said code marking corresponding to said rotor poles;

sensor means stationary with respect to said stator for detecting the logic level of said binary code marking upon rotation of said rotor to produce feedback control pulses having a frequency corresponding to the speed of said rotor;

a source of D.C. drive current for said motor, said source including voltage control means and first adjustable means for varying the voltage produced by said voltage control means;

first and second switching means for supplying drive currents of selected polarities to said first and second stator windings, respectively;

delay circuit means responsive to said feedback control pulses to provide corresponding delayed control pulses;

second adjustable means for varying the delay provided by said delay circuit means; and two-phase logic means responsive to said delayed control pulses to produce first and second phase control signals for selecting the polarities of the drive currents supplied to said first and second stator windings, said first and second adjustable means being coupled so that variations in the voltage produced by said voltage control means are inversely proportional to the variations in the delay provided by said delay circuit means.

2. The controller of claim 1, wherein said first adjustable means comprises a first variable resistor in circuit with said voltage control means, and wherein said second adjustable means comprises a second variable resistor in circuit with said delay circuit means.

3. A controller for a brushless two-phase motor including a rotor and a stator having first and second windings defining stator poles, comprising:

a binary code marking on said rotor, said code marking corresponding to said rotor poles;

sensor means stationary with respect to said stator for detecting the logic level of said binary code marking upon rotation of said rotor to produce feedback control pulses having a frequency corresponding to the speed of said rotor;

a source of D. C. drive current for said motor;

first and second switching means for supplying drive currents of selected polarities to said first and second stator windings, respectively;

delay circuit means responsive to said feedback control pulses to provide corresponding delayed control pulses, wherein said delay circuit means includes a monostable multivibrator responsive to said feedback control pulses to produce a train of delay pulses of selected pulse width and a first NOT logic function gate responsive to said feedback control pulses and to said train of delay pulses to produce said delayed control pulses; and two-phase logic means responsive said delayed control pulses to produce first and second phase control signals for selecting the polarities of the drive currents supplied to said first and second stator windings.

4. The controller of claim 3, wherein said two-phase logic means comprises:

a flip-flop responsive to said delayed control pulses to produce an alternating high and low output;

a second NOT logic function gate connected to receive said flip-flop output and to receive said delayed control pulses to produce said first phase control signal; and a third NOT logic function gate connected to receive a fixed voltage and to receive a flip-flop output to produce said second phase control signal.

5. The controller of claim 3, further including:

first adjustable means for varying the width of said delay pulses to thereby limit the maximum speed of said motor.

6. The controller of claim 5, further including:

second adjustable means for varying the voltage of said D.C. drive current, to thereby vary the torque characteristic of said motor.

7. The controller of claim 6, wherein said first and second adjustable means are coupled so that variations in the voltage produced by said voltage control means are inversely proportional to variations in the delay provided by said delay circuit means.

* * * * *